United States Patent [19]
Keyes

[11] 3,751,100
[45] Aug. 7, 1973

[54] REMOVABLE VEHICLE WINDOW COVER

[76] Inventor: Robert A. Keyes, Box 90873, Inglewood, Calif. 90009

[22] Filed: Dec. 10, 1971

[21] Appl. No.: 206,655

[52] U.S. Cl............................ 296/95 C, 160/368 S
[51] Int. Cl............................................... B60j 1/20
[58] Field of Search............... 296/95 C; 160/368 R, 160/368 S, 354, 106; 24/DIG. 11, DIG. 18

[56] References Cited
UNITED STATES PATENTS

| | | | |
|---|---|---|---|
| 2,944,601 | 7/1960 | Compson | 296/95 C |
| 3,370,818 | 2/1968 | Perr | 24/DIG. 18 |

FOREIGN PATENTS OR APPLICATIONS

| | | | |
|---|---|---|---|
| 611,191 | 12/1960 | Canada | 296/95 C |
| 748,666 | 12/1966 | Canada | 296/95 C |

Primary Examiner—Benjamin Hersh
Assistant Examiner—John A. Pekar
Attorney—Charles G. Lyon et al.

[57] ABSTRACT

A window cover primarily intended to cover the windows of recreational motor vehicles used for camping, the window cover including a transparent, translucent or opaque cover sheet dimensioned to fit a vehicle window, either within the window frame on the window itself or on the window frame, and removably secured thereto by paired separable fastening elements secured respectively to the window or the frame and to the cover sheet. The window cover also includes a removable curtain unti having marginal portions fitting over the margins of the cover sheet.

6 Claims, 7 Drawing Figures

PATENTED AUG 7 1973 3,751,100
INVENTOR.
ROBERT A. KEYES
BY
Lyon & Lyon
ATTORNEYS
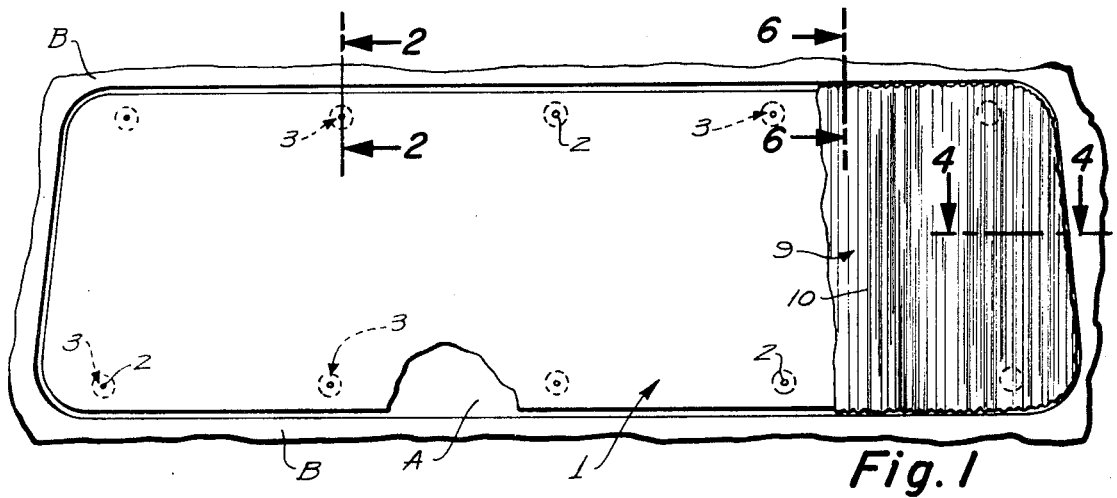
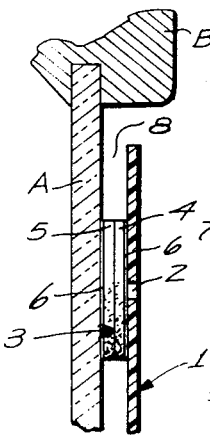
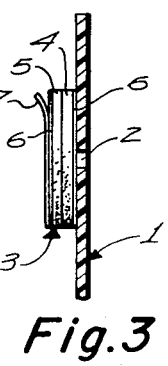
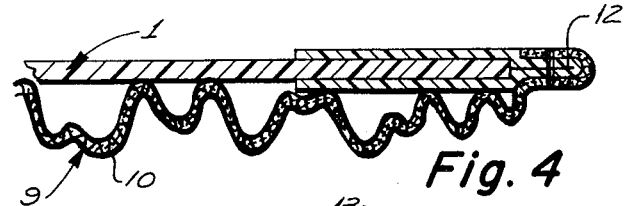
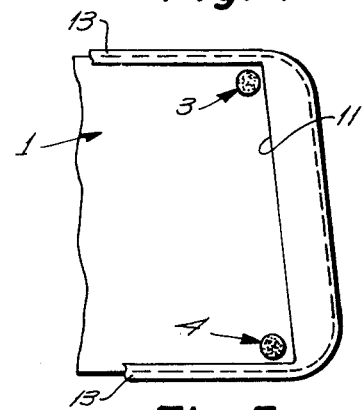
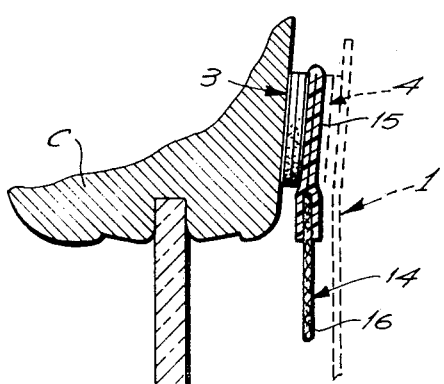

3,751,100

REMOVABLE VEHICLE WINDOW COVER

BACKGROUND OF THE INVENTION

Recreational vehicles, such as vans used for camping, have windows front and rear as well as at the sides some of which are fixed, others being movable. Except for the front window or windshield which is curved and slanted, the windows are usually flat and, if slanted, are slanted substantially less than the windshield. Usually 6 windows are provided, one front, one rear and two at each side; sometimes each side has three windows. Conventionally, cloth curtains are slidably fitted on guide bars or elastic cord mounted above and below the windows. These are not suitable for the windshield and are a nuisance when used at the forward side windows. Also, installation is permanent, so that when folded some obstruction to view remains and may provide a driving hazard.

SUMMARY OF THE INVENTION

The present invention is directed to a removable window cover for vehicles and is summarized in the following objects:

First, to provide a vehicle window cover which is particularly easy to install and remove, this being accomplished in part by using, in a novel manner a separable fastener means known under the trade name VELCRO.

Second, to provide a vehicle window cover which includes a cover sheet dimensioned to fit within the boundaries of the vehicle window or the surrounding frame and formed of cardboard or of plastic material; the cover sheet having a set of VELCRO fastening elements on one side, the locations of which are marked on the other side; initially the pairs of fastening elements are inter-engaged so that the cover sheet may be pressed against the window to cause one of each pair of fastening elements to be secured to the window or window frame by its pressure sensitive adhesive backing and permit repeated subsequent removal and replacement of the cover sheet.

Third, to provide a vehicle window cover as indicated in the preceding objects wherein the margins of the cover sheet is spaced by the fastening elements from the window or adjacent surface to provide a space in which to receive the folded margins of a novelly arranged curtain unit and permit ready installation or removal of the curtain unit from the cover sheet.

Fourth, to provide a vehicle window cover wherein the cover sheet may be dimensioned to fit over the margins of the window frame and be attached thereto to permit movement of the window and may incorporate a screen to permit ventillation.

DESCRIPTION OF THE FIGURES

FIG. 1 is an inside view of a vehicle window with a surrounding frame shown fragmentarily and showing the window cover in place including a curtain unit shown fragmentarily.

FIG. 2 is an enlarged fragmentary sectional view through 2—2 of FIG. 1 with a window frame shown in outline and with one of the fastener units in edge elevation.

FIG. 3 is a sectional view similar to FIG. 2 showing the cover sheet before attachment and indicating the removable protective lamination.

FIG. 4 is an enlarged fragmentary sectional view taken through 4—4 of FIG. 1 showing the cover sheet and a portion of the curtain unit and its means of attachment.

FIG. 5 is a fragmentary side view of the window cover corresponding to FIG. 1 viewed from the outer side thereof indicating the manner of attachment of the curtain unit.

FIG. 6 is an enlarged fragmentary sectional view taken from 6—6 of FIG. 1 indicating a manner of attaching the upper and lower margins of the curtain unit.

FIG. 7 is an enlarged fragmentary sectional view of a movable window and the adjacent window frame indicated in outline and showing the manner of mounting the cover sheet on the window frame; a fastener unit being shown in edge elevation.

A removable vehicle window cover is made in a variety of sizes to accommodate vehicle windows A of various sizes. The window may be fixed and provided with a window frame B as indicated in FIGS. 1 and 2 or may be movable and provided with a window frame C as indicated in FIG. 7.

Each window cover includes a cover sheet 1 dimensioned to fit within the boundaries of the window A or dimensioned so that its margins overly the adjacent window frame. In either case the cover sheet is provided with perforations or markings 2 to indicate the location of fastener units 3.

The fastener units are preferably separable fasteners of a type sold commercially under the trade name VELCRO and manufactured under one or more of the following U.S. Pat. Nos.: 2,717,437; 3,009,235; 3,147,528 and 3,154,837. This type of separable fastener involves two fastener elements 4 and 5 one of which is felt-like in nature or comprises a multiplicity of loops. The other member is provided with a multiplicity of hooks. When the two members are pressed together a random number of hooks engage a corresponding number of loops. The VELCRO fastener is made in several forms for attachment to various objects by various means. The VELCRO construction suitable for use in the present invention has a thin fabric backing formed of plastic material covering each fastener element. The backing of each fastener element is provided with a pressure sensitive adhesive coating 6 initially each coating is provided with a relative non-adherent removable lamination 7. In the exercise of the present invention one of the laminations is removed and the fastener unit 3 is secured to the cover sheet 1 in registry with the marking 2. Initially the other removable laminations 7 remain in place.

In order to install a cover sheet on a window the laminations 7 are removed and the cover sheet is fitted in place within the margins of the window as indicated in FIG. 1 and the fastener unit pressed against the window utilizing the markings 2 to determine the locations of the fastener units so that pressure may be applied locally. The ssame procedure is followed if the cover sheet is dimensioned to fit the window frame as suggested in FIG. 7. Once the fastener units are secured, the cover sheet may be repeatedly removed and replaced. This is preferably done by a pealing action starting at one corner, the cover sheet permitting some flexure so that the force required for removal is minimized.

The fastener units 3 have sufficient thickness so as to space the margins of the cover sheet from the window as indicated by 8 in FIG. 2. This permits the cover sheet to receive a curtain unit 9 which includes a curtain member 10 formed of cloth or other flexible material. The curtain member may be longitudinally stretchable and provided with end pocket members 11. The end members may be folded strips of plastic material which extends beyond the edges of the their sheet to form edge strips 12 for attachment to the curtain member by stitching or by use of adhesive. Alternatively elastic straps sewn to the curtain member may be used.

The curtain units may be attached only at theri ends to the cover sheet in which case the longitudinally margins are stiffened by stretchable elastic members so that the side edges of the curtain member may fold over the upper and lower margins of the cover sheet. Alternatively, a marginal clip 13 formed of plastic material may extend continuously along the upper and lower margins or several clips of short axial length may be used. These may be attached by stitching or by adhesive to the corresponding margins of the curtain member 10.

The curtain units may be arranged for attachment to or removal from the cover sheet while the cover sheet remains in position on the window or may be removed as a unit with the cover sheet or merely the ends of the cover sheet may be separated from the window to facilitate attachment or removal of the curtain units.

The cover sheets may be mounted directly upon a door window or other movable window for, when it is removed, the remaining elements of the fastener units 3 do not interfere appreciably with the movement of the window. However it may be desirable to leave the cover sheet in place when the window is open in which case the cover sheet is mounted on the margins of the window as suggested in FIG. 7. As the purpose for leaving the cover sheet intact in opening the window is to provide ventilation. A special cover sheet 14 may be provided which includes a frame 15 preferably formed of plastic which surrounds a screen 16. In this case the frame 15 may be utilized to receive a cover sheet 1 so as to close the screen 16 as suggested by dotted lines in FIG. 7, or the cover sheet 14 may be arranged to receive a curtain unit 9 which may provide privacy but permit some ventilation.

While particular embodiments of this invention have been shown and described, it is not intended to limit the same to the details of the construction set forth, but instead, the invention embraces such changes, modifications and equivalents of the various parts and their relationships as come within the purview of the appended claims.

I claim:

1. A removable cover for vehicle windows, comprising:
  a. a cover member dimensioned to fit a vehicle window and conform thereto;
  b. a plurality of fastener units, each including mutually engageable and disengageable elements disposed in spaced relation about the margins of the cover member on one surface thereof, each unit having an initially covered adhesive surface;
  c. said cover member adapted to be pressed toward the window to cause adhesive contact by the adhesive surfaces of the units thereby to secure the cover member over the window for repeated mounting and removal by mutual engagement and disengagement of the fastener unit elements.
  d. and a flexible curtain unit dimensioned to fit over the cover member and including side margins overlapping the margins of the cover member for removable attachment thereto.

2. A removable cover for vehicle windows as defined in claim 1, wherein the fastener units form spacer means for the margins of the cover member to receive the margins of the curtain unit.

3. A removable cover for vehicle windows, comprising:
  a. a cover member dimensioned to fit a vehicle window and conform thereto;
  b. a plurality of fastener units, each including mutually engageable and disengageable elements, the fastener units intended to be disposed in spaced relation about the margins of the cover member on one surface thereof, each unit having at opposite sides an adhesive surface and a removable cover element;
  c. and means on at least one surface of the cover member identifying the intended location of each fastener unit for placement of unit in registry with said means upon removal of a cover element;
  d. said cover member adapted, upon removal of the second cover element, to be pressed toward the window to cause adhesive contact by the opposed adhesive surfaces of the units thereby to secure the cover member over the window for subsequent repeated removing and remounting the cover member by mutual disengagement and engagement of the fastener unit elements.

4. A removable cover for vehicle windows as defined in claim 3, wherein:
  a. the cover member is dimensioned to fit over the frame of the window and the fastener units are adhered to the window frame.

5. A removable cover for vehicle windows as defined in claim 4, wherein:
  a. the cover member includes a central screen and a marginal mounting frame.

6. A removable cover for vehicle windows as defined in claim 3, wherein:
  a. the cover member is dimensioned to fit within the boundaries of the window and the fastener units are adhered to the window.

* * * * *